(12) United States Patent
Chang

(10) Patent No.: US 6,945,766 B1
(45) Date of Patent: Sep. 20, 2005

(54) SCOOPER HAVING ICE CREAM REMOVING DEVICE

(76) Inventor: Shu Chen Chang, P.O. Box 63-298, Taichung (TW) 406

(*) Notice: Subject to any disclaimer, the term of this patent is extended or adjusted under 35 U.S.C. 154(b) by 0 days.

(21) Appl. No.: 10/888,614

(22) Filed: Jul. 12, 2004

(51) Int. Cl.[7] ............................................. A23F 9/28
(52) U.S. Cl. ..................... 425/285; 425/286; 425/444; 30/324
(58) Field of Search ..................... 425/221, 376–286, 425/444; 30/324; D7/324

(56) References Cited

U.S. PATENT DOCUMENTS

| 4,699,582 A | * | 10/1987 | Chen ........................... 425/187 |
| 6,851,574 B1 | * | 2/2005 | Traynor ........................... 222/1 |
| 2004/0089982 A1 | * | 5/2004 | Witthoft ..................... 264/334 |

FOREIGN PATENT DOCUMENTS

EP          1 371 314 A1  * 12/2003

OTHER PUBLICATIONS

English abstract for EP 1 371 314.*

* cited by examiner

Primary Examiner—Donald Heckenberg

(57) ABSTRACT

An ice cream scooper includes a shank having a handle on one end and a scooper member on the other end, and a flexible panel attached to the scooper member and engageable with an ice cream ball scooped and received in the scooper member. An actuator is pivotally attached to the scooper member, and includes an arm engageable with the flexible panel, to move and actuate the flexible panel relative to the scooper member, and to disengage the ice cream ball from the scooper member. The arm includes a protrusion engaged into a slot of the panel, to solidly attach the arm to the panel. The scooper member includes a passage to slidably receive the hand grip of the actuator.

12 Claims, 7 Drawing Sheets

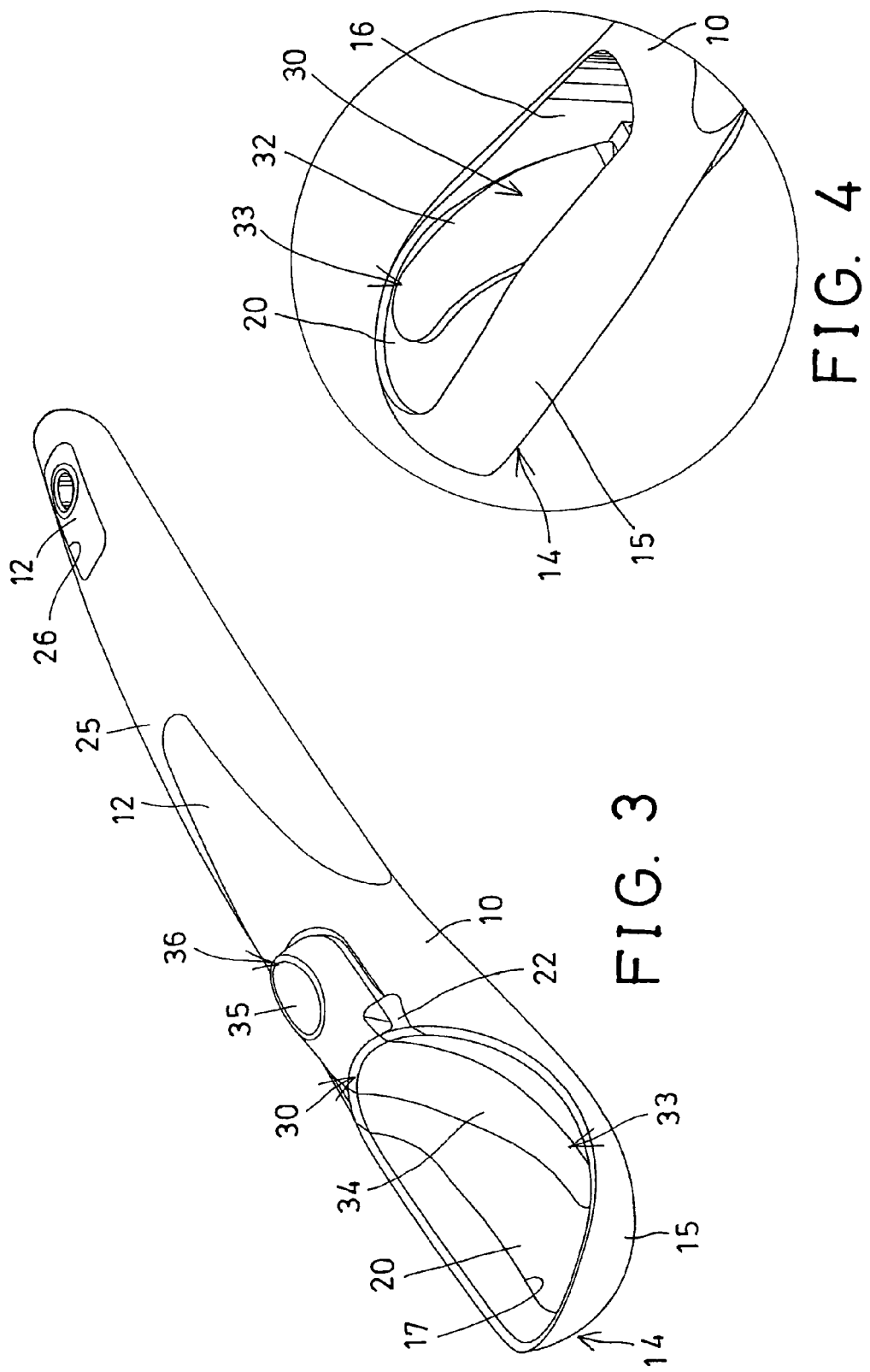

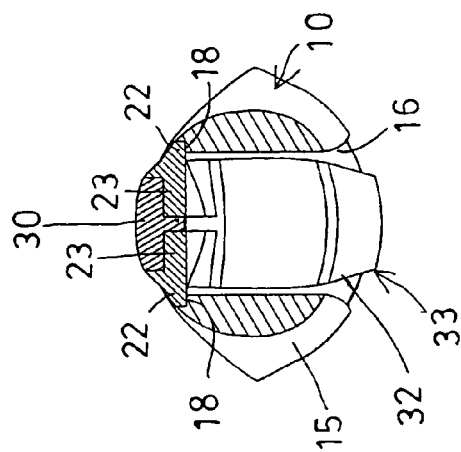
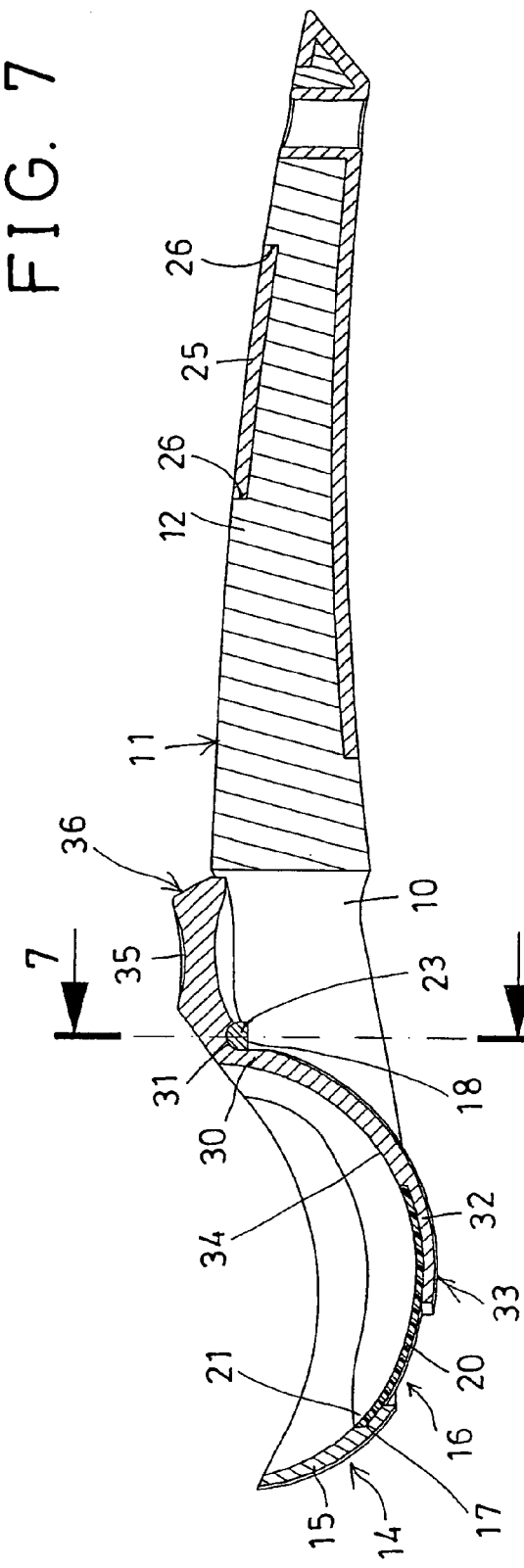

SCOOPER HAVING ICE CREAM REMOVING DEVICE

BACKGROUND OF THE INVENTION

1. Field of the Invention

The present invention relates to an ice cream scooper, and more particularly to an ice cream scooper having a removing device for easily removing or disengaging the scooped ice cream from the scooper.

2. Description of the Prior Art

Typical ice cream scoopers comprise a spoon or scooper body for engaging into ice cream that is contained in ice cream bottles or the like, for scooping the ice cream from the ice cream bottles in ball shape.

However, after the ice cream has been scooped from the ice cream bottles, the ice cream may be stuck onto the scooper and may not be easily and quickly removed or disengaged from the scooper. The users may have to use the other objects to engage with the ice cream, and then to remove or disengage the ice cream from the scooper, such that the ice cream may not be removed or disengaged from the scooper in beautiful or perfect ball shape.

The present invention has arisen to mitigate and/or obviate the afore-described disadvantages of the conventional ice cream scoopers.

SUMMARY OF THE INVENTION

The primary objective of the present invention is to provide an ice cream scooper including a removing device for easily removing or disengaging the scooped ice cream from the scooper, and for allowing the ice cream to be removed or disengaged from the scooper in beautiful or perfect ball shape.

In accordance with one aspect of the invention, there is provided a ice cream scooper comprising a shank including a handle provided on one end thereof, and a scooper member provided on other end thereof, a flexible panel attached to the scooper member, and engageable with an ice cream ball scooped and received in the scooper member, and an actuator pivotally attached to the scooper member, and including an arm extended therefrom and engageable with the flexible panel, to move and actuate the flexible panel relative to the scooper member, and to disengage the ice cream ball from the scooper member.

The scooper member includes a peripheral shoulder formed therein, the panel includes an outer peripheral portion engaged into the peripheral shoulder of the scooper member, to solidly and stably secure the panel to the scooper member. The scooper member may further include at least one notch formed therein, the panel includes at least one block received in the notch of the scooper member, to solidly secure the panel to the scooper member.

The panel includes at least one axle extended therefrom, the actuator includes at least one cavity formed therein, to rotatably receive the axle of the panel, and to pivotally attach the actuator to the scooper member.

The panel includes a slot formed therein and defined by a peripheral flange, and the arm includes an outer peripheral portion engaged onto the peripheral flange of the panel, to move and to actuate the panel relative to the scooper member.

The arm includes a protrusion extended therefrom and engaged into the slot of the panel. The protrusion of the arm includes a shape similar to that of the slot of the panel, to allow the protrusion to be snugly fitted within the slot of the panel. The panel includes at least one projection extended the peripheral flange, and engaged with the outer peripheral portion of the arm.

The actuator includes a hand grip extended therefrom, and extended opposite to the arm, for rotating the arm relative to the flexible panel and the scooper member. The scooper member includes a passage formed therein, to slidably receive the hand grip of the actuator, and to allow the hand grip of the actuator to be depressed and rotated relative to the scooper member.

The shank includes a sleeve attached onto the handle, for allowing users to comfortably grasp the handle of the shank. The handle of the shank includes at least one protuberance extended therefrom, and the sleeve includes at least one opening formed therein, to receive the protuberance of the shank, and to stably attach the sleeve onto the handle, and to prevent the sleeve from being moved relative to the handle.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 3 is a perspective view of the ice cream scooper;

FIG. 4 is a partial bottom perspective view of the ice cream scooper;

FIG. 6 is a cross sectional view taken along lines 6—6 of FIG. 5;

FIG. 7 is a cross sectional view taken along lines 7—7 of FIG. 6;

DETAILED DESCRIPTION OF THE PREFERRED EMBODIMENT

Figure 1:
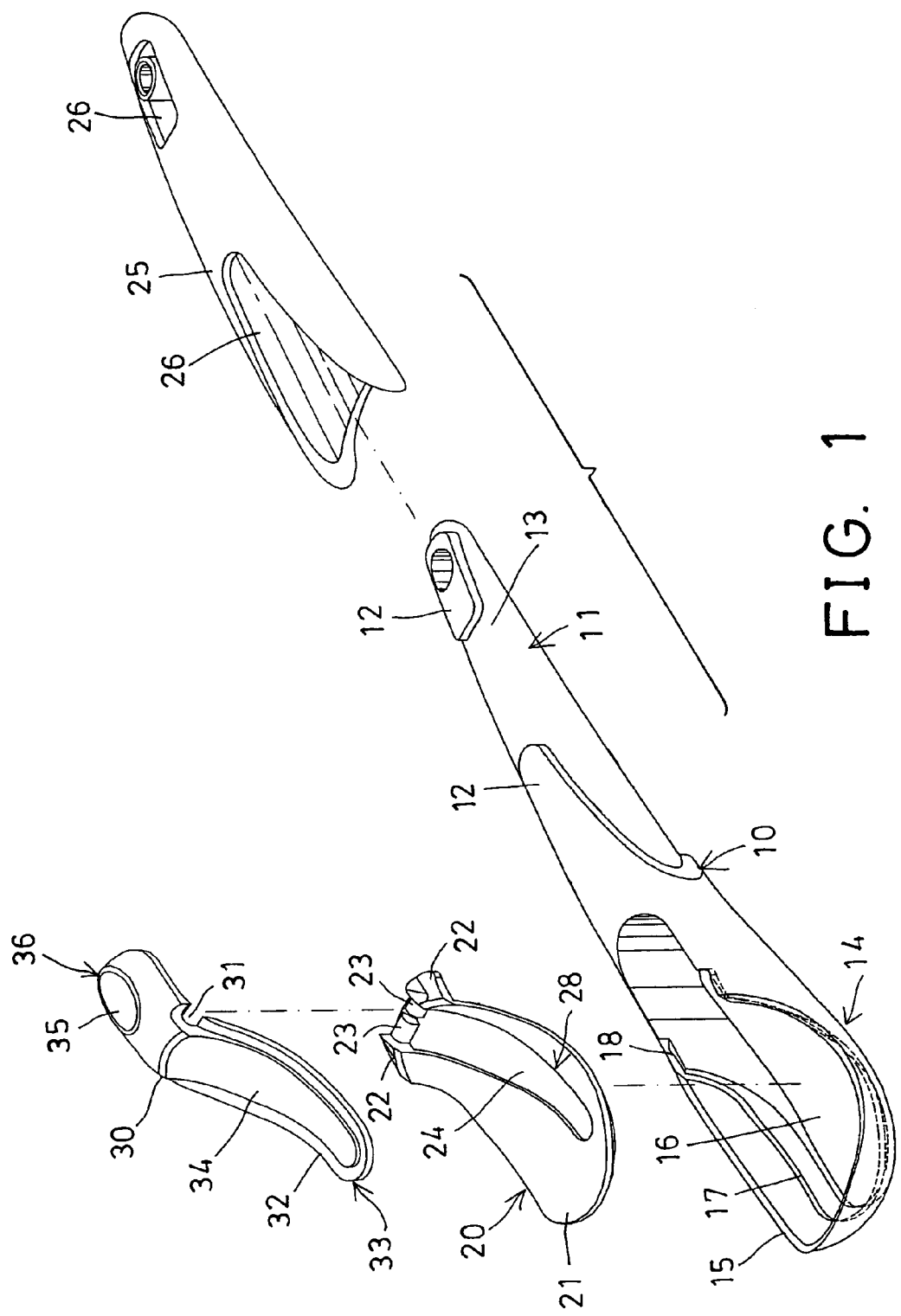
FIG. 1 is an exploded view of an ice cream scooper in accordance with the present invention.

Referring to the drawings, and initially to FIGS. 1–6, an ice cream scooper in accordance with the present invention comprises a shank 10 including a handle 11 formed or provided on one end thereof, and one or more protuberances 12 extended outwardly from the handle 11, to form or define one or more recesses 13 in the handle 11.

The shank 10 includes the other end 14 having a scooper member 15 formed or provided thereon, and a passage 16 formed in the scooper member 15, and a peripheral shoulder 17, and one or more, such as two notches 18 formed in the scooper member 15, best shown in FIG. 1.

A flexible or resilient panel 20 is attached or secured to a bottom portion or an intermediate portion of the scooper member 15 with such as molding or mold-injection processes, and is preferably made of rubber or other synthetic materials that include a suitable resilience or softness, in order to partially block or enclose the passage 16 of the shank 10, or to block or enclose a portion of the passage 16 of the shank 10.

The panel 20 includes an outer peripheral portion 21 engaged into the peripheral shoulder 17 of the scooper member 15, and includes one or more, such as two blocks 22 formed in one end thereof and received and secured in the notches 18 of the scooper member 15, to allow the panel 20 to be solidly and stably attached or secured to the scooper member 15, and to be prevented from being moved or disengaged from the scooper member 15.

Figure 2:
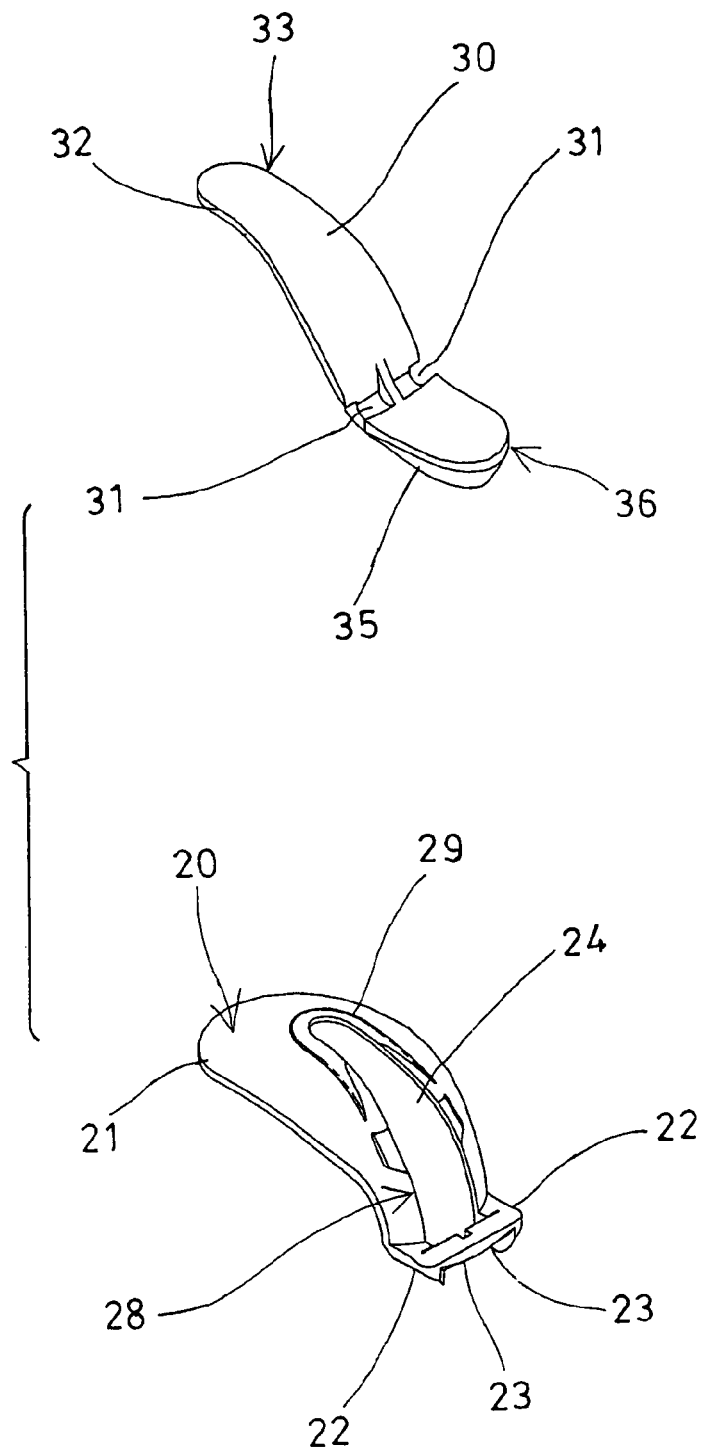
FIG. 2 is a partial exploded view of the ice cream scooper, as seen from bottom thereof.
Figure 5:
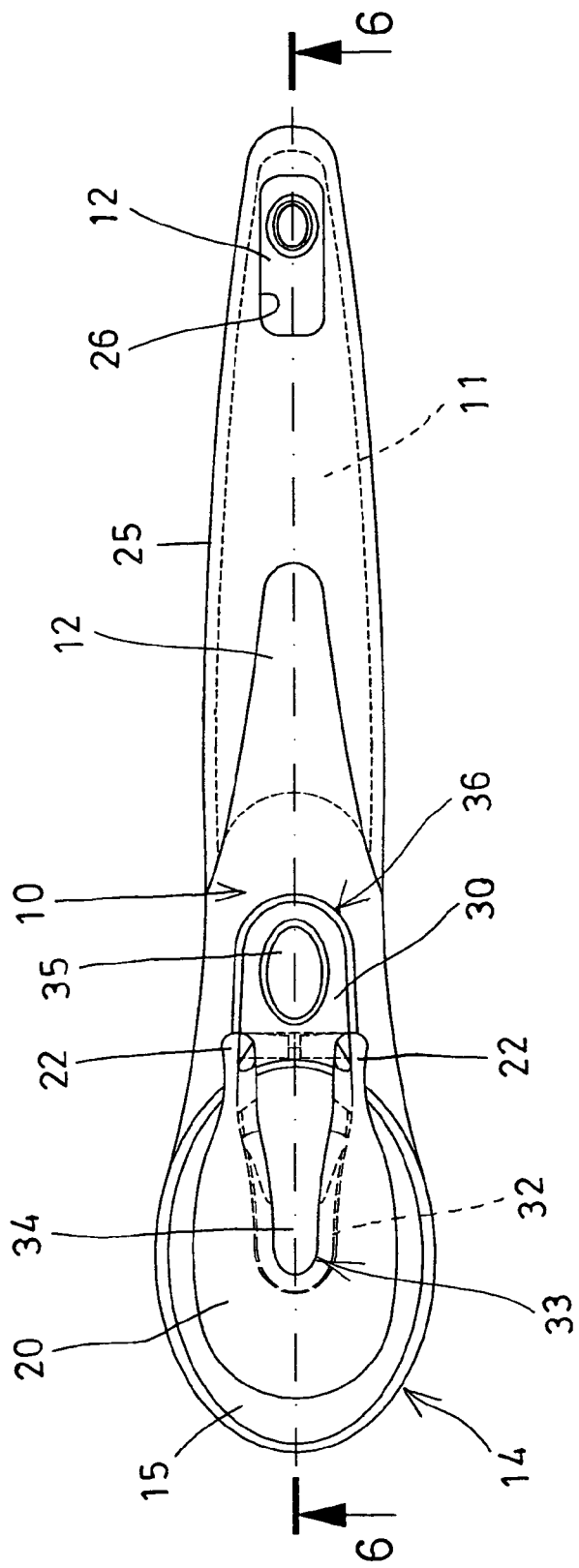
FIG. 5 is a top plan view of the ice cream scooper.

The panel 20 further includes one or more axles 23 extended from one end thereof, or extended from the blocks 22, and further includes a slot 24 formed in an intermediate portion thereof and defined by a peripheral flange 28, and may further include one or more projections 29 extended therefrom, such as extended downwardly therefrom the peripheral flange 28, and thus arranged around the intermediate slot 24 thereof (FIG. 2).

Alternatively, the blocks 22 and the axles 23 may also be directly formed onto or extended from the shank 10, instead of being formed onto or extended from the panel 20. However, the formation or provision of the blocks 22 and the axles 23 on the panel 20 allows the panel 20 to be solidly and stably attached or secured to the scooper member 15.

A soft or flexible or resilient outer covering or sleeve 25 may further be provided and attached or secured to the handle 11 of the shank 10 with such as molding or mold-injection processes, and is also preferably made of rubber or other synthetic materials that include a suitable resilience or softness, for allowing the users to comfortably hold or grasp the handle 11 of the shank 10.

The sleeve 25 includes one or more openings 26 (FIG. 1) formed therein, to receive the protuberances 12 of the shank 10, and to stably attach or secure the sleeve 25 onto the handle 11 of the shank 10, and to prevent the sleeve 25 from being moved or disengaged from the handle 11 of the shank 10.

An actuator 30 includes one or more, such as two cavities 31 formed in an intermediate portion thereof, to rotatably or pivotally receive the axles 23 of the panel 20 or of the scooper member 15, and includes an arm 32 extended or provided on one end thereof and arranged or located beneath the panel 20. The arm 32 includes an outer peripheral portion 33 engaged onto the panel 20, such as engaged onto the peripheral flange 28 and/or the projections 29, to move or to actuate the panel 20, but to prevent the arm 32 from moving out through the slot 24 of the panel 20.

Figure 8:
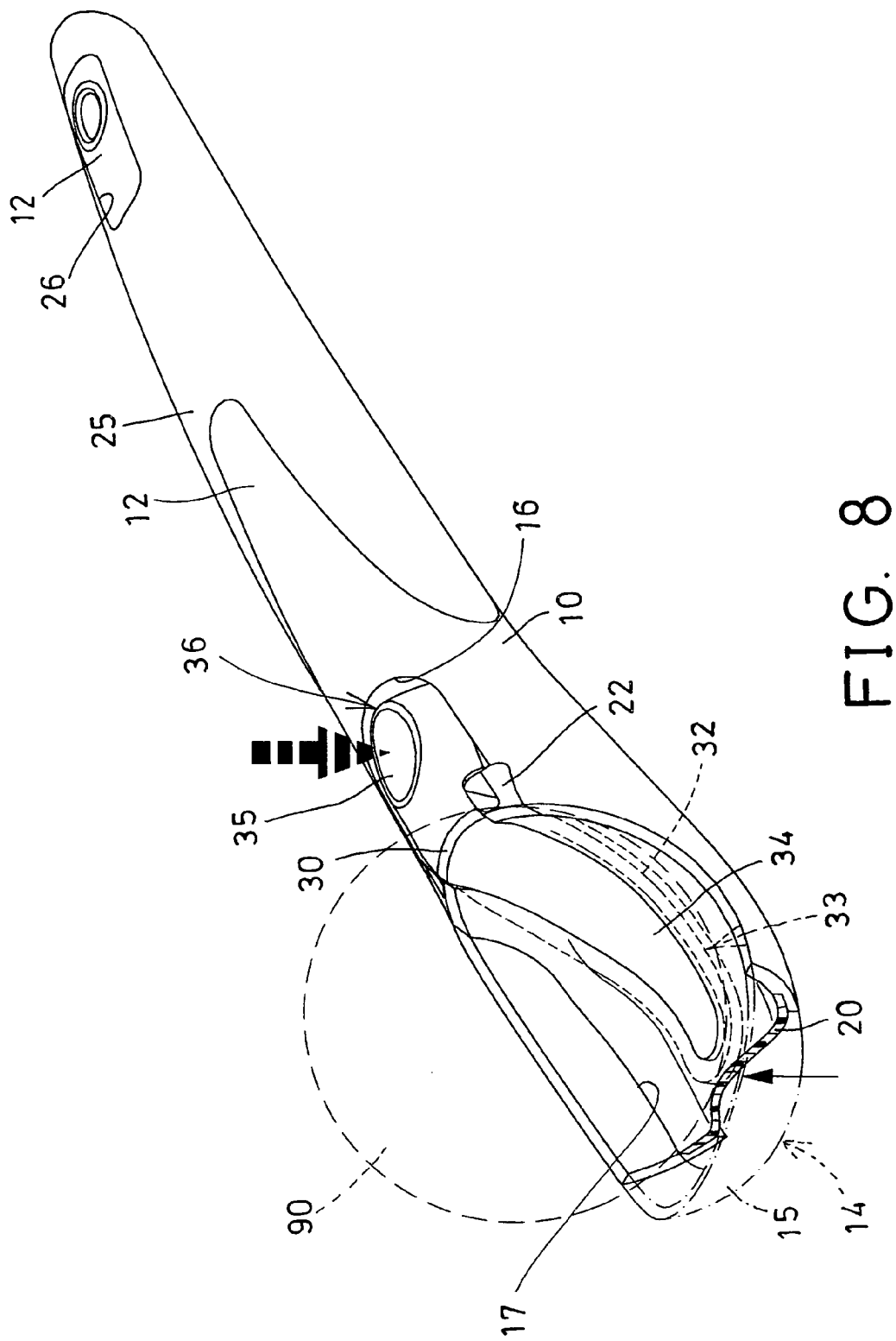
FIG. 8 is a perspective view illustrating the operation of the ice cream scooper.
Figure 9:
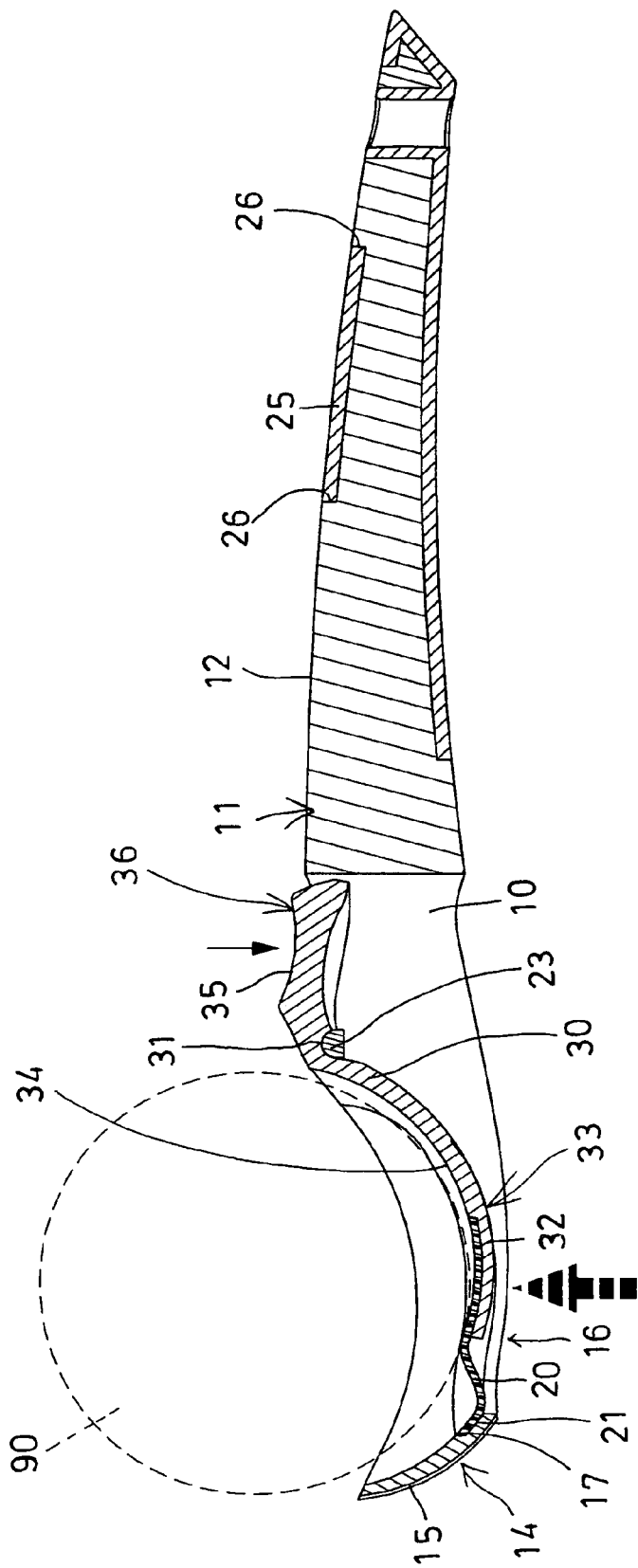
FIG. 9 is a cross sectional view similar to FIG. 6, illustrating the operation of the ice cream scooper.

It is preferable that the arm 32 includes a protrusion 34 formed or extended from an intermediate portion thereof, and having a shape or contour similar or identical to that of the slot 24 of the panel 20, to allow the protrusion 34 to be snugly fitted within the slot 24 of the panel 20, to allow the arm 32 to move or to actuate the panel 20 (FIGS. 8, 9).

The actuator 30 further includes a hand grip 35 formed or extended from the other end 36 thereof, or extended opposite to the arm 32, and preferably slidably received in the passage 16 of the shank 10 (FIGS. 6–9), to allow the hand grip 35 to be moved or depressed in the passage 16 of the shank 10, and thus to be rotated relative to the shank 10, in order to force or to rotate the arm 32 to move or to actuate the panel 20.

The panel 20 may be solidly or firmly attached or secured to the scooper member 15 with such as molding or mold-injection processes, and may have the outer peripheral portion 21 thereof engaged into the peripheral shoulder 17 of the scooper member 15, and/or may have the blocks 22 received and secured in the notches 18 of the scooper member 15, to allow the panel 20 to be solidly and stably attached or secured to the scooper member 15.

The arm 32 of the actuator 30 may also be solidly or firmly attached or secured to the peripheral flange 28 of the panel 20 with such as molding or mold-injection processes, and/or may have the outer peripheral portion 33 thereof secured to the peripheral flange 28 of the panel 20 with adhesive materials, or by welding processes after the actuator 30 has been separately made, to prevent the arm 32 of the actuator 30 from being disengaged from the panel 20, and for allow the panel 20 to be effectively moved or actuated by the arm 32 of the actuator 30.

In operation, as shown in FIGS. 8 and 9, after scooping an ice cream ball 90 in the scooper member 15, the panel 20 may also be disengaged or contacted with the ice cream ball 90, the hand grip 35 may be moved or depressed or rotated relative to the shank 10, in order to force or to rotate the arm 32 to move or to actuate the panel 20, and thus to loose or to disengage the ice cream ball 90 from the scooper member 15, and thus to allow the ice cream ball 90 to be easily and quickly removed or disengaged from the scooper member 15 in beautiful or perfect ball shape.

The panel 20 and the sleeve 25 are made of rubber or other synthetic materials that include a suitable resilience or softness, and the shank 10 and the actuator 30 may also be made of formed with such as molding or mold-injection processes, and are preferably made of plastic, metal, or other synthetic or stronger materials that include a suitable hardness or strength, to allow the panel 20 to be effectively moved or actuated by the arm 32 of the actuator 30, and to allow the sleeve 25 to be softly and comfortably held or grasped by the users.

Accordingly, the ice cream scooper in accordance with the present invention includes a removing device for easily removing or disengaging the scooped ice cream from the scooper, and for allowing the ice cream to be removed or disengaged from the scooper in beautiful or perfect ball shape.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An ice cream scooper comprising:
   a shank including a handle provided on one end thereof, and a scooper member provided on other end thereof,
   a flexible panel attached to said scooper member, and engageable with an ice cream ball scooped and received in said scooper member, and
   an actuator pivotally attached to said scooper member, and including an arm extended therefrom and engageable with said flexible panel, to move and actuate said flexible panel relative to said scooper member, and to disengage the ice cream ball from said scooper member.

2. The ice cream scooper as claimed in claim 1, wherein said scooper member includes a peripheral shoulder formed therein, said panel includes an outer peripheral portion engaged into said peripheral shoulder of said scooper member, to solidly and stably secure said panel to said scooper member.

3. The ice cream scooper as claimed in claim 1, wherein said scooper member includes at least one notch formed therein, said panel includes at least one block received in said at least one notch of said scooper member, to solidly secure said panel to said scooper member.

4. The ice cream scooper as claimed in claim 1, wherein said panel includes at least one axle extended therefrom, said actuator includes at least one cavity formed therein, to rotatably receive said at least one axle of said panel, and to pivotally attach said actuator to said scooper member.

5. The ice cream scooper as claimed in claim 1, wherein said panel includes a slot formed therein and defined by a peripheral flange, and said arm includes an outer peripheral portion engaged onto said peripheral flange of said panel, to move and to actuate said panel relative to said scooper member.

6. The ice cream scooper as claimed in claim 5, wherein said arm includes a protrusion extended therefrom and engaged into said slot of said panel.

7. The ice cream scooper as claimed in claim 6, wherein said protrusion of said arm includes a shape similar to that of said slot of said panel, to allow said protrusion to be snugly fitted within said slot of said panel.

8. The ice cream scooper as claimed in claim 5, wherein said panel includes at least one projection extended said peripheral flange, and engaged with said outer peripheral portion of said arm.

9. The ice cream scooper as claimed in claim 1, wherein said actuator includes a hand grip extended therefrom, and extended opposite to said arm, for rotating said arm relative to said flexible panel and said scooper member.

10. The ice cream scooper as claimed in claim 9, wherein said scooper member includes a passage formed therein, to slidably receive said hand grip of said actuator, and to allow said hand grip of said actuator to be depressed and rotated relative to said scooper member.

11. The ice cream scooper as claimed in claim 1, wherein said shank includes a sleeve attached onto said handle, for allowing users to comfortably grasp said handle of said shank.

12. The ice cream scooper as claimed in claim 11, wherein said handle of said shank includes at least one protuberance extended therefrom, and said sleeve includes at least one opening formed therein, to receive said at least one protuberance of said shank, and to stably attach said sleeve onto said handle, and to prevent said sleeve from being moved relative to said handle.

* * * * *